United States Patent [19]

Parady

[11] Patent Number: 5,812,816
[45] Date of Patent: Sep. 22, 1998

[54] SYSTEM AND METHOD FOR TRANSFERRING DATA BETWEEN MEMORIES OF DIFFERENT TYPES OCCUPYING A SINGLE REAL ADDRESS SPACE USING A DEDICATED MEMORY TRANSFER BUS

[75] Inventor: Bodo K. Parady, Danville, Calif.

[73] Assignee: Sun Microsystems, Inc., Mountain View, Calif.

[21] Appl. No.: 806,860

[22] Filed: Feb. 26, 1997

Related U.S. Application Data

[63] Continuation of Ser. No. 460,188, Jun. 2, 1995, abandoned.
[51] Int. Cl.$^6$ .............................. G06F 12/00; G06F 13/00
[52] U.S. Cl. ......................... 395/492; 395/474; 395/405; 395/308
[58] Field of Search ..................................... 395/403, 412, 395/416, 417, 413, 444, 448, 449, 470, 492, 474, 405, 308

[56] References Cited

U.S. PATENT DOCUMENTS

| | | | |
|---|---|---|---|
| 4,774,659 | 9/1988 | Smith et al. ............................. | 395/418 |
| 5,185,694 | 2/1993 | Edenfield et al. ....................... | 395/287 |
| 5,214,775 | 5/1993 | Yabushita et al. ....................... | 395/444 |
| 5,241,641 | 8/1993 | Iwasa et al. ............................. | 395/449 |
| 5,249,282 | 9/1993 | Segers ..................................... | 395/449 |
| 5,313,647 | 5/1994 | Kaufman et al. ........................ | 395/700 |
| 5,355,467 | 10/1994 | MacWilliams et al. ................ | 395/473 |
| 5,386,547 | 1/1995 | Jouppi ..................................... | 395/449 |

OTHER PUBLICATIONS

"Small L2 Options Exclusive Lines", IBM Technical Disclosure Bulletin, vol. 36, No. 12, Dec. 1983, pp. 305–306.
"Vertical Partitioning in Cache Hierarchies", IBM Technical Disclosure Bulletin, vol. 30, No. 8, Jan. 1988, pp. 305–306.

*Primary Examiner*—Glenn Gossage
*Attorney, Agent, or Firm*—Blakely, Sokoloff, Taylor & Zafman

[57] ABSTRACT

A system and method for transferring data over a dedicated memory transfer bus between high and low speed memories of a computer system which share a single real memory address space are disclosed. The dedicated memory transfer bus operates independently from the system bus to avoid any adverse effects on bandwidth and latency of the system bus and to allow virtually any memory hierarchy to be selected. The transfer is controlled by the operating system software upon the execution of instructions issued by the memory management unit. Status information such as "invalid" state is used to direct the transfer.

11 Claims, 5 Drawing Sheets

SYSTEM AND METHOD FOR TRANSFERRING DATA BETWEEN MEMORIES OF DIFFERENT TYPES OCCUPYING A SINGLE REAL ADDRESS SPACE USING A DEDICATED MEMORY TRANSFER BUS

This is a continuation of U.S. patent application Ser. No. 08/460,188 filed Jun. 2, 1995, now abandoned.

BACKGROUND OF THE INVENTION

1. Field of the Invention

The present invention relates to the field of computer systems. More particularly, the present invention relates to a flexible memory hierarchy including a dedicated memory transfer bus, controlled by an operating system, for exchanging data between different memory types.

2. Description of Related Art

It is common knowledge that a conventional computer system comprises a central processing unit ("CPU") and a memory system. Generally, during read cycles, the CPU fetches data of an arbitrary bit length (e.g., blocks) from physical (or real memory) address locations within the memory system. Since the CPU normally operates at a greater speed than the memory system, the overall performance of the computer system is significantly influenced by the rate at which data may be accessed from memory ("bandwidth") and the time delay experienced by the CPU before it obtains access to such data ("memory latency").

Typically, in order to achieve a requisite bandwidth and to provide a requisite amount of addressable memory space, the memory system is arranged according to a strict, inflexible hierarchy. This hierarchy typically features multiple memory types, each of these memory types having a predetermined, unique physical (or real memory) address space. Examples of these memory types include low-speed main memory (e.g., dynamic random access memory "DRAM", video random access memory "VRAM", etc.), high-speed cache memory (typically being a multiple-level cache having a bandwidth greater than the low-speed memory), and remote memory (disk storage devices, main memory of another computer system, etc.) being "slower" (i.e., having a lesser bandwidth) than both cache and main memory. Typically, "high-speed" memory has a bandwidth of approximately 83 MHz or an access time of approximately 12 nanoseconds while low speed memory and remotely located memories have a bandwidth of approximately 20 MHz or an access time of approximately 50 nanoseconds and 3.3 KHz or an access time of approximately 300 microseconds, respectively.

According to this inflexible memory hierarchy, the most-recently-used data is stored in the high-speed cache memory and lesser used data is stored in the other slower memory types. Although the above-described inflexible hierarchy provides a cost-effective approach in achieving a requisite bandwidth for a given memory space, it possesses a number of disadvantages.

One disadvantage associated with the conventional, inflexible memory hierarchy is that pre-configured hardware (e.g., a CPU controller), employed. within the computer system, is utilized as an oracle to predict what data is likely to be accessed in the near future and writes that data into both cache memory and main memory. However, this method of prediction may not be varied by the computer operator nor by the operating system of the computer system, both of which would be more accurate predictors than the CPU controller. In fact, the computer operator would have knowledge as to which data will be more frequently accessed by an application program.

Another disadvantage associated with the conventional, inflexible memory hierarchy is that it is quite susceptible to cache collisions. Such susceptibility is primarily due to the fact that certain cache lines are re-used more frequently than other cache lines according to conventional cache and operating system storage techniques well-known in the art.

Yet another disadvantage is that the conventional memory hierarchy imposes constraints on the size of a data transfer, usually limited to a single cache line or another predetermined data structure of equivalent size. These constraints are imposed because data transfers greater than a cache line would consume greater memory bus bandwidth, increase memory latency and reduce CPU bandwidth.

SUMMARY OF THE INVENTION

The present invention relates to a flexible memory hierarchy of a computer system featuring a memory transfer bus for enabling data to be transferred between two different types of memories. Size constraints of the data transferred through the memory transfer bus is greatly relaxed because the memory transfer bus operates independently from any other buses in the computer system. Thus, data transfers on the memory transfer bus have no adverse effect on timing and bandwidth characteristics of the memory transfer bus or the other buses.

In lieu of relying on pre-configured hardware to control data storage within the high-speed and low-speed memories, the present invention utilizes the operating system to control data transfers on the memory transfer bus. The operating system is chosen as the controlling mechanism because it provides two advantages over pre-configured hardware; namely, it usually predicts with more accuracy which data is accessed more frequently than other data and it allows re-configuration by the computer operator.

As stated in more detailed in the detailed description, a data transfer through the memory transfer bus occurs when a processor node of the computer system transmits an instruction to transfer data from a source address "S_Address" associated with a first type of memory to a target address "T_Address" associated with a second type of memory. The first type of memory detects the instruction and places a page of data onto the memory transfer bus. Since the memory transfer bus may be incapable of transferring an entire page of data in parallel, portions of the page of data may be transferred in succession. Thereafter, this data is transferred to the T_Address location of the second type of memory for subsequent storage and use.

BRIEF DESCRIPTION OF THE DRAWINGS

The features and advantages of the present invention will become apparent from the following detailed description of the present invention in which.

DETAILED DESCRIPTION OF THE INVENTION

In the following detailed description, the present invention describes a system and method for providing a flexible memory hierarchy utilizing a memory transfer bus which, under the control of programmable operating system software, is dedicated to transferring data between different memory types. For clarity, our description shall focus on the transfer of data between high-speed and low-speed memories sharing a single real memory address space since transfers between these memories and remote-memories occurs in the same fashion.

Throughout this description, a number of specific details are set forth, while in some instances, well-known circuits or procedural steps are not set forth in order to avoid unnecessarily obscuring the present invention. It is apparent, however, to a person of ordinary skill in the art, that the present invention may be practiced without incorporating these specific components or through slight modification of procedural steps listed in the illustrative flowcharts.

For the scope of this application, a "node" is defined as one or more hardware components used to perform a given operation. In addition, "data" may include binary data and/or instructions, both of which are generically referred to as "data" unless otherwise distinguished. Moreover, a "page" is defined as a predetermined number of sub-blocks, each of which includes at least one byte of data and status information (e.g., a status bit) to indicate whether the byte(s) of data stored within the sub-block are "valid" or "invalid".

Figure 1:
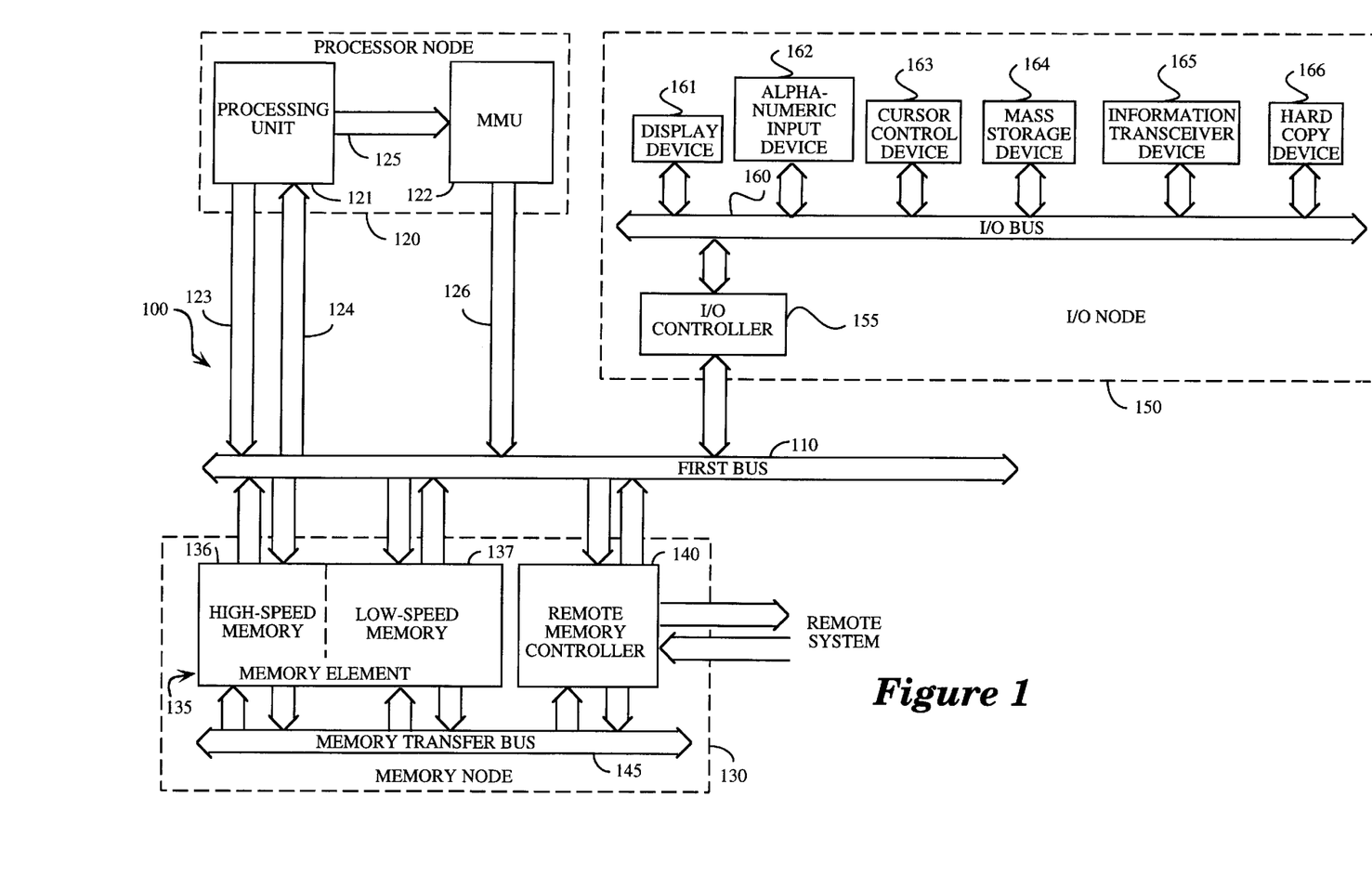
FIG. 1 is a block diagram of an illustrative embodiment of a computer system employing a dedicated memory transfer bus.

Referring to FIG. 1, an illustrative embodiment of a computer system 100 in accordance with the present invention is illustrated. The computer system 100 comprises a first bus 110, preferably a central processing unit ("CPU") bus, including data, address and control bus lines preferably configured with bit widths of 128, 32 and 8 bits respectively. It is contemplated, however, that these above-listed bus lines may be configured with any bit width. The first bus 110 allows information (i.e., data, address and/or control) to be communicated between a plurality of nodes including, but not limited to, a processor node 120, a memory node 130 and an input/output ("I/O") node 150.

As shown, the processor node 120 includes at least one processing unit 121 and a memory management unit ("MMU") 122. Although only one processing unit 121 is illustrated in this embodiment, it is contemplated that multiple processing units could be employed herein. In FIG. 1, the processing unit 121 is coupled to the first bus 110 through a pair of unidirectional signal lines 123 and 124, which collectively enable the processing unit 121 to receive information from and transfer information to the memory node 130.

The processing unit 121 is further coupled to the MMU 122 via communication lines 125 so that the processing unit 121 can transfer a virtual address to the MMU 122 which, in turn, translates the virtual address into a real memory address. Such translation is accomplished through translation tables provided by operating system software. These translation tables include a high-speed memory translation table and a low-speed translation table for converting a particular virtual address into its corresponding real memory address utilized by the high-speed and low-speed memories, respectively. The MMU 122, coupled to the first bus 110 via unidirectional signal line 126, places the real memory address corresponding to the virtual address and necessary control information onto the first bus 110 to be read by the memory node 130. The control information may include, but is not limited to, operation type, bus grant, bus ownership and sharing modes such as Modified Owned Exclusive Shared Invalid ("MOESI"), Modified Exclusive Shared Invalid ("MESI"), etc.

The I/O node 150 includes an I/O controller 155 which operates as an interface between the first bus 110 and a conventional I/O bus 160. This provides a communication path (i.e., gateway) to allow nodes coupled to the first bus 110 and the I/O bus 160 to exchange information. The I/O bus 160 communicates information to at least one peripheral device in the computer system 100 including, but not limited to a display device 161 (e.g., cathode ray tube, liquid crystal display, flat panel display, etc.) for displaying images; an alphanumeric input device 162 (e.g., an alphanumeric keyboard, etc.) for communicating information and command selections to the processing unit 121; a cursor control device 163 (e.g., a mouse, trackball, touch pad, joystick, etc.) for controlling cursor movement; a mass storage device 164 (e.g., magnetic tapes, hard disk drive, floppy disk drive, etc.) for storing data; an information transceiver device 165 (fax machine, modem, scanner etc.) for transmitting information from the computer system 100 to another system and for receiving information from another system; and a hard copy device 166 (e.g., plotter, printer, etc.) for providing a tangible, visual representation of the information. It is contemplated that the computer system 100 shown in FIG. 1 may employ some or all of these components or different components than those illustrated.

The memory node 130 includes a memory element 135 storing data associated with the real memory address and a remote memory controller 140, similar to a CPU controller, which controls a transmission of a single sub-block of data (e.g., a single cache line being 32-bytes in size) between the computer system 100 and a remote system. Preferably, the memory element 135 is page-mapped memory organized into a plurality of pages wherein each page has a plurality of consecutive memory addresses. The memory element 135 is populated with high-speed memory 136 (e.g., static random access memory) and low-speed memory 137 (e.g., dynamic random access memory "DRAM", video random access memory "VRAM" and the like). Although these memories 136 and 137 have different performance levels, they share a single, real memory address space contrary to conventional memory hierarchies. Thus, the memory element 135 is scalable, in that bandwidth of the memory element 135 may be increased and memory latency reduced by populating it with a greater proportion of high-speed memory 136.

The memory element 135 and the remote memory controller 140 are coupled to a dedicated memory transfer bus 145 having an arbitrary-chosen bit width. This bit width is chosen for optimal data transfer and thus, may vary from the bit width of the first bus 110. The memory transfer bus 145 primarily supports data transfers between the high-speed and low-speed memories 136 and 137. These data transfers are initiated by the processing unit 121 and controlled by the operating system software through the processing unit. These data transfers typically are "bulk" memory transfers in increments of a "page" of data at a time. Contrary to conventional memory hierarchies, data transfers through the dedicated memory transfer bus 145 may occur without substantial effect on the bandwidth of the first bus 110.

Figure 2:
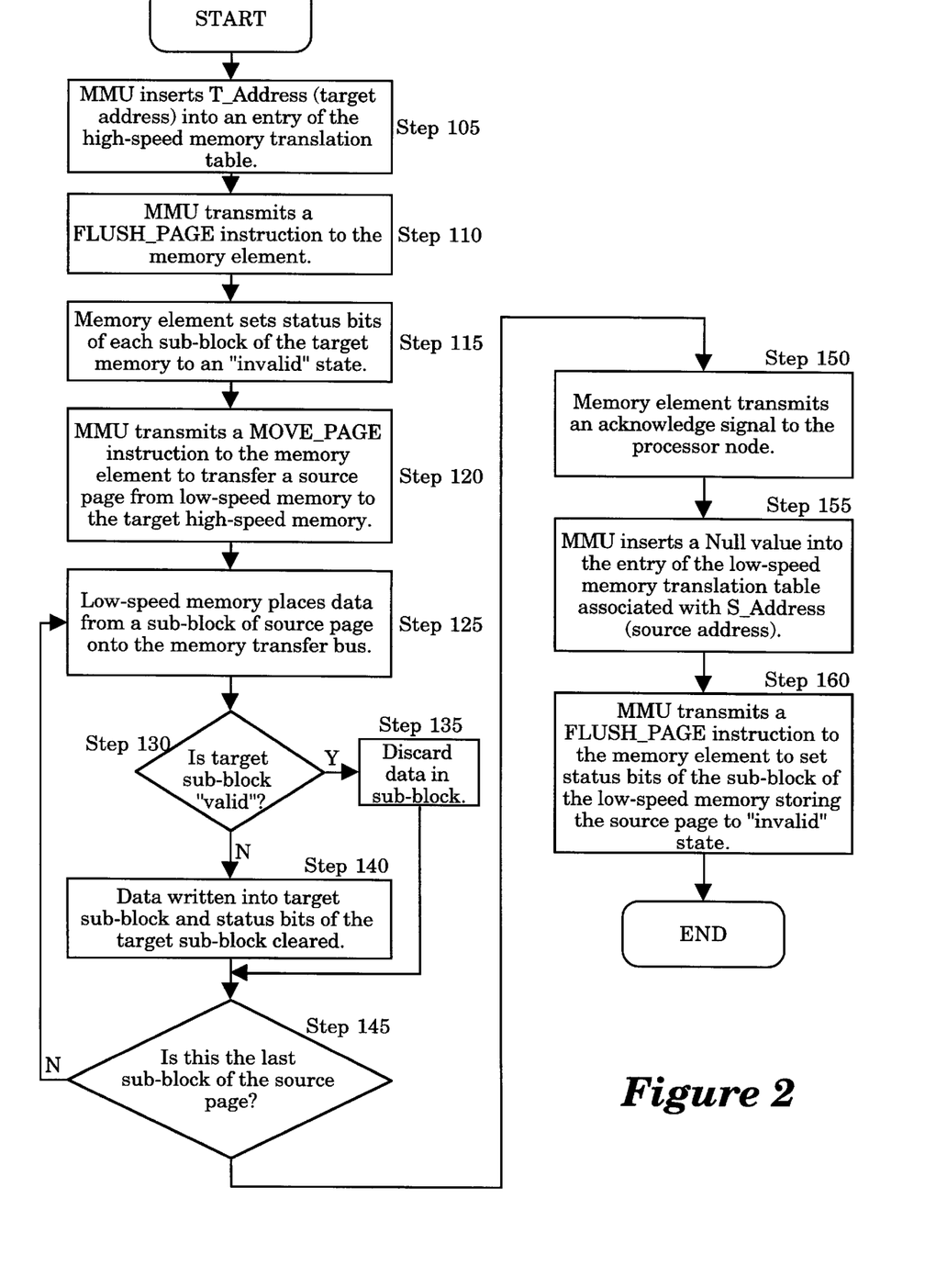
FIG. 2 is a flowchart of an illustrative procedure undertaken by the processor node and the memory element in performing memory transfers on the dedicated memory transfer bus from high-speed memory to low-speed memory.

Referring to FIG. 2, a data transfer from low-speed memory to high-speed memory through the dedicated memory transfer bus begins with Step 105 by the processor node, namely the MMU, inserting a targeted real memory page address ("T_Address") into an available entry of a high-speed memory translation table. The T_Address is the address in the high-speed memory targeted to receive a page of data during the data transfer (hereinafter referred to as "target memory"). This is done so that any subsequent memory "read" or "write" instructions to the virtual address corresponding to the T_Address are directed to the high-speed memory. Thereafter, as shown in Step 110, the MMU transmits a FLUSH_PAGE instruction to the memory element corresponding to the high-speed memory and the low-speed memory which causes the memory element to set or assert the status bits of each sub-block of the target memory to indicate that these sub-blocks contain "invalid" data (Step 115). The performance of this instruction enables data to be written to the target memory and stalls any memory "read" requests transmitted to the target memory prior to clearing or deasserting the status bits to reflect the presence of "valid" data.

Referring still to FIG. 2, in Step 120, the MMU transmits an instruction ("MOVE_PAGE") to the memory element to move a page of data beginning at a source page address "S_Address" (hereinafter referred to as a "source page") from the low-speed memory to the target (high-speed) memory. Upon receiving the MOVE_PAGE instruction, the low-speed memory sequentially places the data from each sub-block of the source page onto the memory transfer bus (Step 125). Before transferring a first sub-block of the source page, the memory system determines whether a first sub-block of the target memory (i.e., "first targeted sub-block"), being the destination of the first sub-block placed on the memory transfer bus, is "valid" (Step 130). This determination is performed to check whether the processing unit wrote data to the first targeted sub-block after the FLUSH_PAGE instruction but before the MOVE_PAGE instruction because the operations on the memory transfer bus are independent of the first bus operations. If the first targeted sub-block is "valid", the memory system is configured to discard the data associated with the first sub-block (Step 135) and check whether the first sub-block is the last sub-block of the source page (Step 145). However, if the targeted sub-block is "invalid", the data within the first sub-block is written into the first targeted sub-block and the status bit of the first targeted sub-block is cleared indicating that valid data resides therein (Step 140). The data transfer procedure continues until the data associated with the last sub-block of the source page is transferred (Step 145).

Thereafter, the memory element transmits an acknowledge signal ("MOVE_FINISH") to the MMU (Step 150). The MOVE_FINISH signal causes the MMU to insert a "Null" value into an entry of a low-speed memory translation table associated with or previously containing the S_Address (Step 155). By inserting the Null value, the entry is cleared to allow the operating system to reuse the entry and the memory corresponding to that entry. In addition, the MMU transmits a FLUSH_PAGE instruction to the low-speed memory in order to set those sub-blocks used to store the source page to "invalid" state (Step 160).

Figure 3:
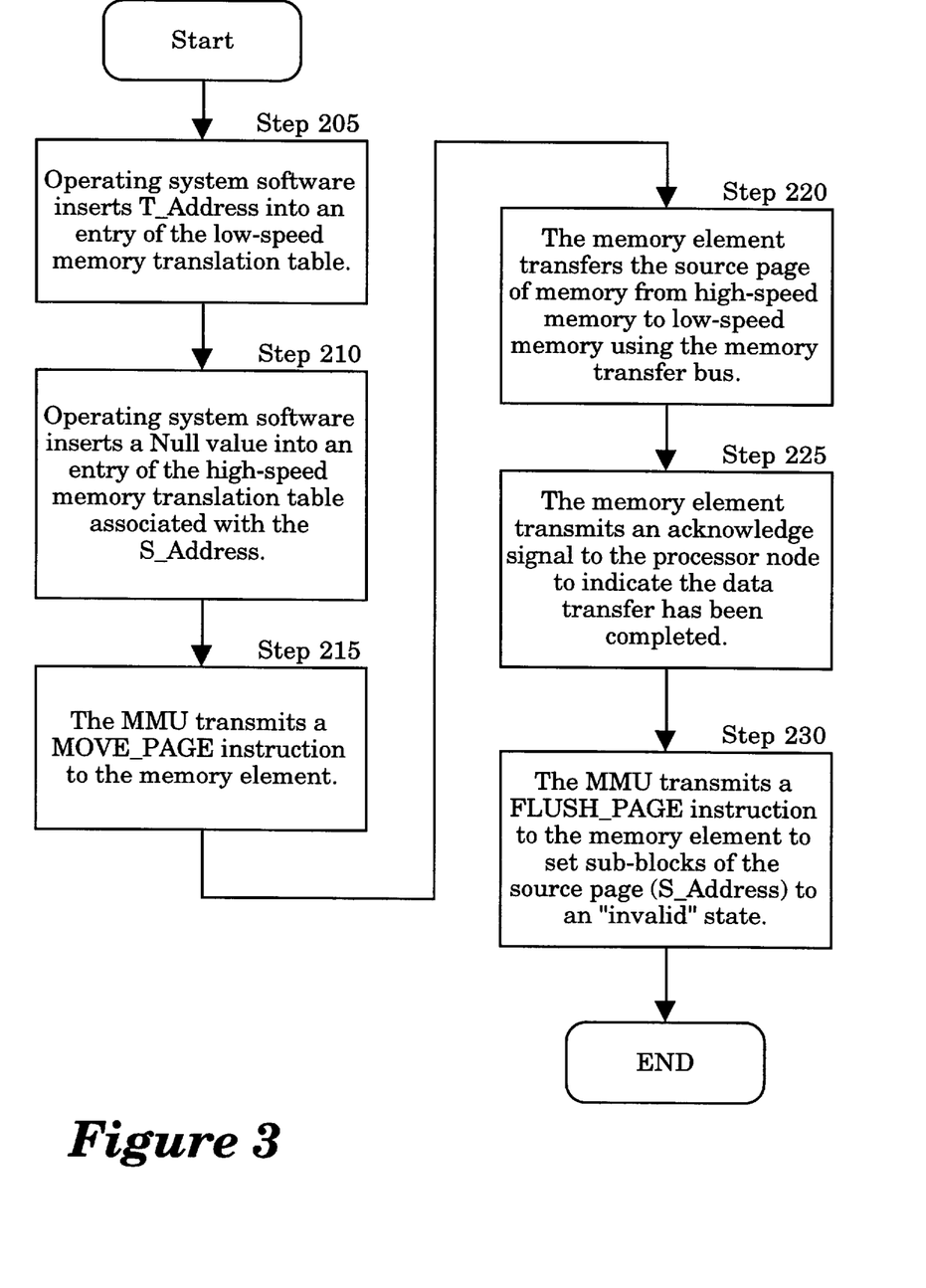
FIG. 3 is a flowchart an illustrative procedure undertaken by the processor node and the memory element in performing memory transfers on the dedicated memory transfer bus from low-speed memory to high-speed memory.

Besides performing data transfers from low-speed memory to high-speed memory, the memory transfer bus supports data transfers from high-speed memory to low-speed memory. Referring to FIG. 3, initially the operating system software, which primarily governs virtual-to-real mapping, inserts a T_Address into an available entry of the low-speed memory translation table and inserts a Null value into an entry associated with the high-speed memory translation table at S_Address (Steps 205–210). In this embodiment, the processor node has no control over the data transfers from the high-speed to the low-speed memory since such data transfers are not immediately required by the processing unit.

After the operating system software has set the low-speed and high-speed memory translation tables, the MMU transmits a MOVE_PAGE instruction to the memory element to request the memory element to transfer a source page beginning at S_Address in the high-speed memory into the low-speed memory at the T_Address (Step 215). Thereafter, upon completion of the data transfer utilizing the memory transfer bus as described above in Steps 125–145, with the exception that the data transfer is from the high-speed to low-speed memory, the memory element returns a MOVE_FINISH signal acknowledging that the data transfer has been completed (Steps 220–225). This prompts the MMU to transmit the FLUSH_PAGE instruction to the memory element in order to set status bits of the sub-blocks associated with the source page at S_Address to an "invalid" state (Step 230).

Referring back to FIG. 1, during execution of an application program, the processing unit 121 frequently requires data stored in the memory element 135. In order to obtain such data, the processor node 120 typically produces the memory "read" request. Since data transfers between different memory types along the dedicated memory transfer bus 145 may occur during the memory read request, it is necessary to provide a procedure which supports both operations concurrently.

Figure 4:
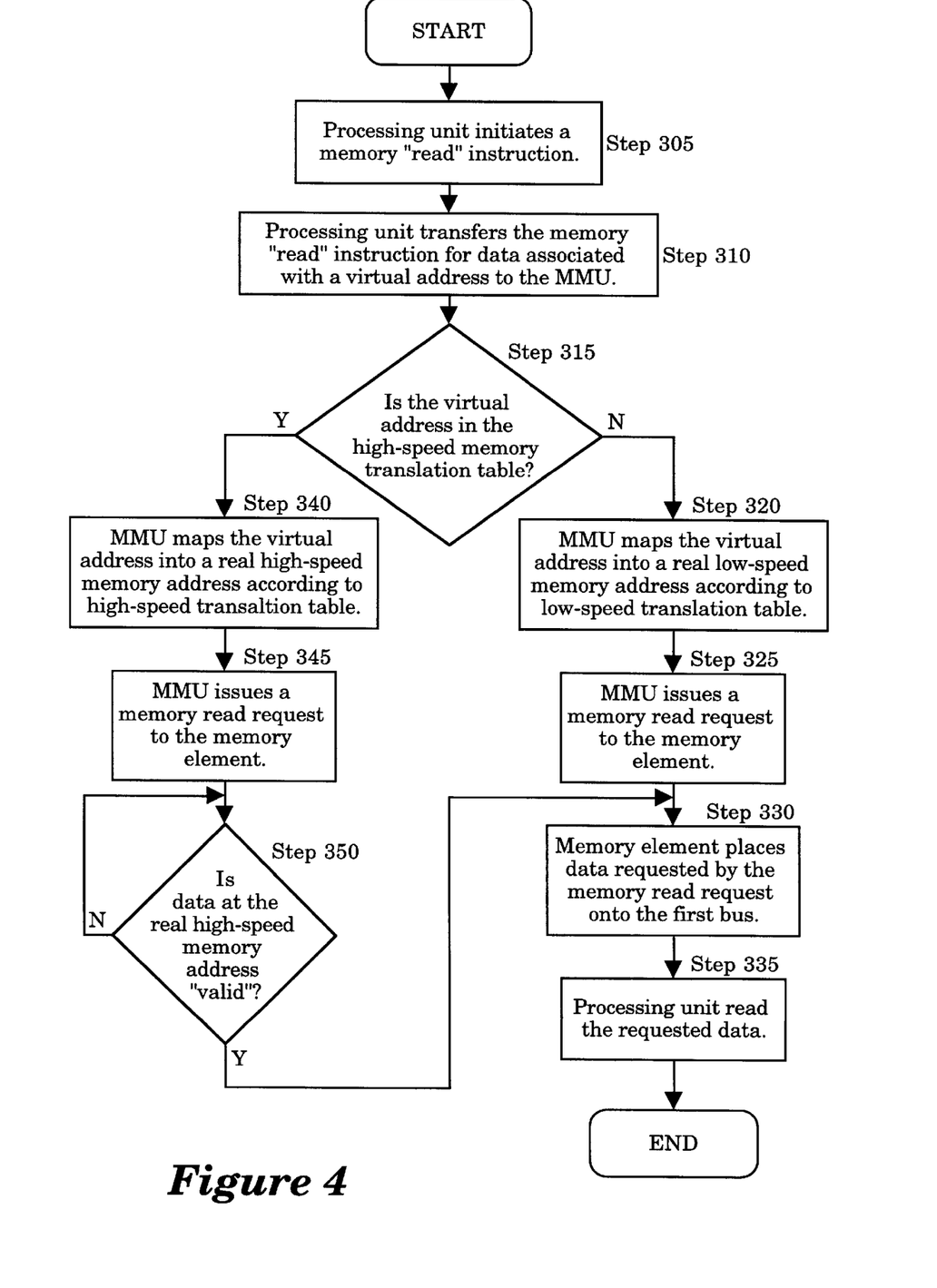
FIG. 4 is a flowchart illustrating a memory "read" request being performed in the computer system capable of supporting data transfers via a memory transfer bus as shown in FIG. 1.

Referring now to FIG. 4, an illustrative procedure for supporting both memory read requests and data transfers through the memory transfer bus is shown. To perform a memory read request, the processing unit initiates a memory "read" instruction (Step 305) and thereafter, transfers the memory "read" instruction for data stored within a particular virtual address into the MMU (Step 310). If the MMU determines that the virtual address is not included in the high-speed memory translation table, normally maintained by operating system software, the MMU maps the virtual address into a real low-speed memory address according to the low-speed memory translation table (Steps 315–320). Thereafter, the MMU issues a memory read request by placing the real low-speed memory address along with any necessary control information including operation type, bus grant, bus ownership, sharing modes such as MOESI, MESI, etc. onto the first bus for servicing by the memory element (Step 325). Upon detecting that the MMU has made the memory read request, the memory element services the memory read request by placing the requested data onto the first bus to be subsequently read by the processing unit (Steps 330–335).

Alternatively, if the MMU determines in step 315 that the virtual address is included in the high-speed memory translation table, the MMU maps the virtual address into a real high-speed memory address according to the high-speed memory translation table (Step 340). Thereafter, the MMU issues a memory read request by placing this real high-speed memory address along with any control information onto the first bus for servicing by the memory element (Step 345).

Upon detecting the memory read request, the memory element determines whether the data at the real memory address is "valid" (Step 350). This is done to prevent accessing data which is invalid because, for example, an outstanding data transfer has not yet completed prior to the memory read request. If valid, the memory element services the memory read request by placing the requested data onto the data bus to be subsequently read by the processing unit (Steps 330–335). Otherwise, if the data is invalid, the memory element waits for the data transfer to complete and the data is validated. The address remains in the memory system buffers until the data is available. Memory address requests are buffered in the memory system.

Figure 5:
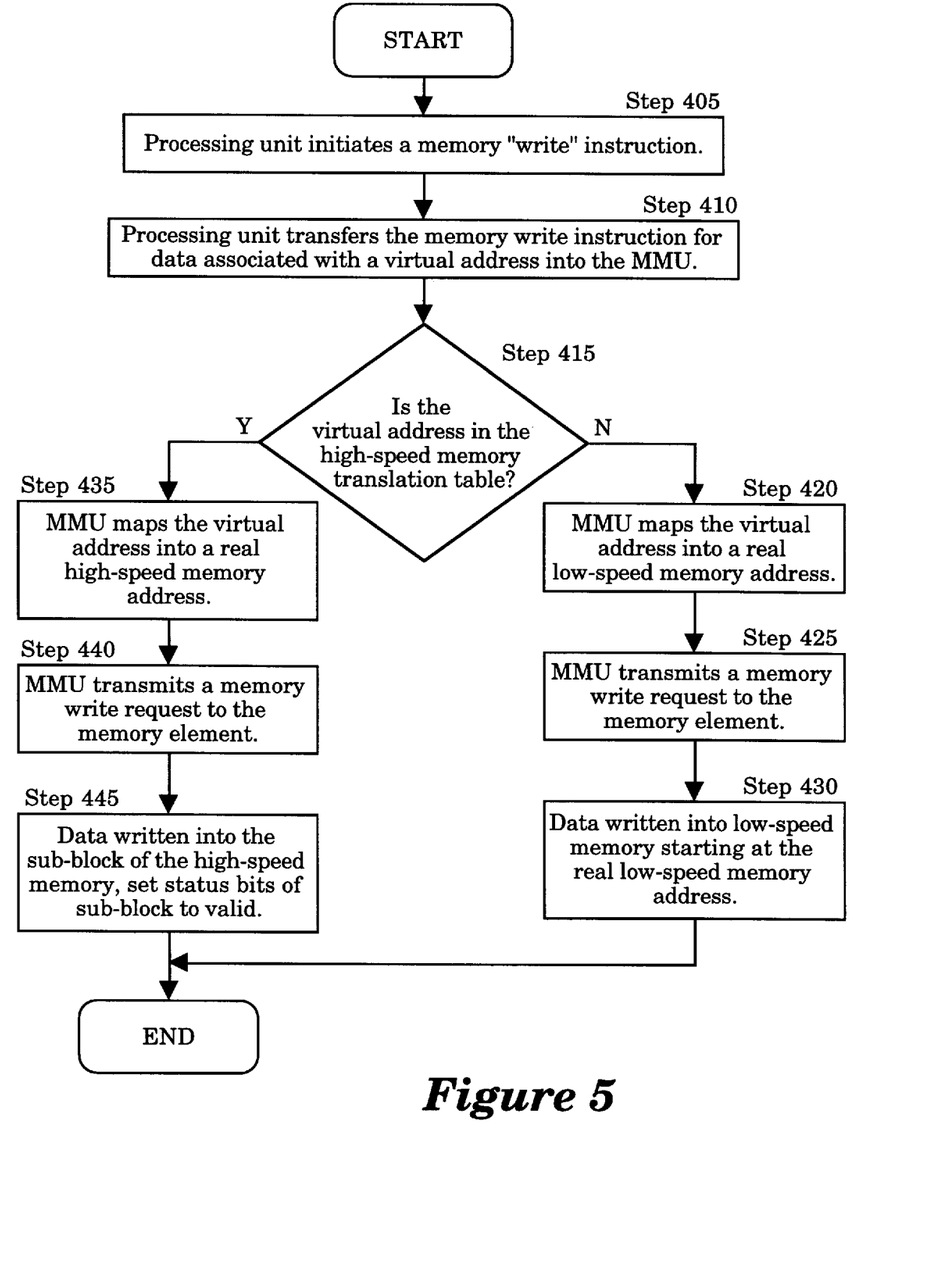
FIG. 5 is a flowchart illustrating a memory "write" request being performed in the computer system capable of supporting data transfers via a memory transfer bus as shown in FIG. 1.

Referring now to FIG. 5, an illustrative procedure for supporting both a memory write request and data transfer through the memory transfer bus is shown. The processing unit initiates a memory write instruction (Step 405) and thereafter, transfers the memory write instruction for data stored within a particular virtual address into the MMU (Step 410). If the MMU determines that the virtual address is not included in the high-speed memory translation table, the MMU maps the virtual address into a low-speed real memory address according to the low-speed memory translation table (Step 415–420). Thereafter, the MMU issues a memory write request by placing the low-speed real memory address along with any necessary control information onto the first bus for servicing by the memory element as the processor places the data onto the first bus to be written into the low-speed memory of the memory element (Step 425–430).

Alternatively, if the MMU determines in step 415 that the virtual address is included in the high-speed memory translation table, the MMU maps the virtual address into a real high-speed memory address according to the high speed translation table (Steps 415, 435). Thereafter, the MMU issues a memory write request by placing the real high-speed memory address along with any control information onto the first bus for servicing by the memory element (Step 440). Thereafter, the data is written into the sub-block and the status bit associated with the sub-block is cleared to indicate that the data is "valid" (Step 445).

It is contemplated that data transfers between the memory element and a remote system via the memory transfer bus follow the same procedures as discussed in FIGS. 2 and 3 with a few exceptions. One exception is that the remote system may only read "copy blocks" having read-only access from the memory element of the computer system; however, the computer system can read a single block (e.g., one cache line) of data from the remote system and write a single block of data from the remote system into the memory element. A second exception is that it is not possible for the remote system to write data to another remote system without permission being granted by the operating system of the computer system. This can be circumvented, however, through additional status information.

The present invention described herein may be designed in many different methods and using many different configurations. While the present invention has been described in terms of various embodiments, other embodiments may come to mind to those skilled in the art without departing from the spirit and scope of the present invention. The invention should, therefore, be measured in terms of the claims which follow.

What is claimed is:

1. A method for transferring data between a first memory and a second memory of a memory element through a dedicated memory transfer bus, the first memory and the second memory occupying a single, real memory address space, the method comprising the steps of:

receiving an instruction to transfer a page of data, residing in a plurality of sub-blocks within the first memory, from the first memory to the second memory;

sequentially transferring the page of data from the first memory onto the dedicated memory transfer bus;

writing data residing in each of the plurality of sub-blocks into a corresponding target sub-block of a plurality of target sub-blocks of the second memory, provided the corresponding targeted sub-block is in an "invalid" state; and setting status information of the plurality of target sub-blocks to represent that at least one of the target sub-blocks is in an "invalid" state.

2. The method according to claim 1, wherein if said second memory is high-speed memory having a greater bandwidth than said first memory, before the receiving step, the method comprising the steps of inserting a target address into an entry of a high-speed memory translation table; and setting status bits of the plurality of target sub-blocks of the second memory to an "invalid" state to allow the page of data to be written into the plurality of target sub-blocks.

3. The method according to claim 2, wherein the sequentially transferring step includes the steps of outputting data associated with one of the plurality of sub-blocks onto the dedicated memory transfer bus;

propagating the data through the dedicated memory transfer bus; and determining whether a status bit of the target sub-block represents a "valid" state, wherein skipping the target sub-block if the sub-block is "valid", and performing the writing step if the sub-block is "invalid".

4. The method according to claim 1, wherein prior to the setting step, the method further includes a step of transmitting a control signal from the first memory to a processor node to indicate that the page of data has been transferred through the dedicated memory transfer bus.

5. The method according to claim 4, wherein after the step of transmitting the control signal from the first memory to the processor node, the method further includes the step of inserting a Null value into an entry of a low-speed memory translation table associated with the plurality of sub-blocks.

6. The method according to claim 1, wherein if said second memory is low-speed memory having a lesser bandwidth than said first memory, before the receiving step, the method comprises the steps of inserting a target address into an entry of a low-speed memory translation table by operating system software, which entry represents the plurality of target sub-blocks; and inserting a Null value into an entry of a high-speed memory translation table representing the plurality of sub-blocks.

7. The method according to claim 6, wherein prior to the setting step, the method further includes the step of transmitting a signal from the first memory to a processor node to indicate that the page of data has been transferred through the dedicated memory transfer bus.

8. A method of controlling a memory data transfer between a first memory and a second memory of a memory element by a memory management unit (MMU), the method comprising the steps of:

determining whether one of the first memory and the second memory is accessed;

inserting a target address into an entry in a target memory translation table;

inserting a source address into a source entry in a source memory translation table;

causing the second memory to indicate that a target sub-block at said target address is in an "invalid" state;

transferring a source page of data starting from the source address in the first memory to the target address in the second memory;

receiving an acknowledge signal from one of the first memory and the second memory to indicate that the memory data transfer is completed;

inserting a "Null" value into the source memory translation table to indicate that at least one of the source entry and the source memory translation table is available for use; and causing the first memory to indicate that a source sub-block at said source address is in the "invalid" state.

9. The method of claim 8 wherein said step of causing the second memory to indicate that said target sub-block at said target address is in an "invalid" state includes a step of transmitting a "flush_page" instruction to the memory.

10. The method of claim 8 wherein said transferring step includes a step of transmitting a "move_page" instruction to at least one of the first memory and the second memory.

11. The method of claim 8 wherein said step of causing the first memory to indicate that said source sub-block at said source address is in the "invalid" state includes a step of transmitting a "flush_page" instruction to the memory.

* * * * *